[19] United States Patent
DeGeorge et al.

[11] 4,290,463
[45] Sep. 22, 1981

[54] LOADING ARM

[75] Inventors: Bernard J. DeGeorge, Kingsland; Dean E. Hermanson, Richardson; Carlos Tomas, Dallas, all of Tex.

[73] Assignee: Youngstown Sheet and Tube Company, Pittsburgh, Pa.

[21] Appl. No.: 129,240

[22] Filed: Mar. 11, 1980

[51] Int. Cl.$^{3}$ .......................... B65B 3/18; B65G 67/00
[52] U.S. Cl. .................................... 141/387; 137/615; 141/290; 285/168
[58] Field of Search .................... 137/615; 141/59, 99, 141/279, 284, 285, 290, 387, 388; 285/136, 168, 181

[56] References Cited

U.S. PATENT DOCUMENTS

| | | | |
|---|---|---|---|
| 3,372,715 | 3/1968 | Ashton | 141/387 X |
| 3,753,453 | 8/1973 | Madden | 141/387 |
| 3,825,045 | 7/1974 | Bloomquist | 141/387 X |

*Primary Examiner*—Frederick R. Schmidt
*Attorney, Agent, or Firm*—Vinson & Elkins

[57] ABSTRACT

A loading arm having dual inboard and outboard arms and dual connections for connecting the arm to a tank in which provision is made for the loading arm to be connected to side-by-side flanges on the tank and to provide for movement of the connecting system in three mutually perpendicular planes relative to the outboard arm of the loading arm.

10 Claims, 4 Drawing Figures

LOADING ARM

This invention relates to loading arms and particularly loading arms providing for removal of vapor from a tank being filled.

The transfer of liquids into a tank frequently results in formation of vapors which preferably are removed from the tank as it is filled. Also, vapors may be present in a tank before it is filled which are desirably removed during the filling operation.

To prevent venting these vapors into the atmosphere, it has been proposed to conduct these vapors through a suitable loading arm to a disposal facility. See U.S. Pat. No. 2,803,269; No. 3,176,730; No. 3,753,453; and No. 3,825,045. Each of these patents discloses a loading arm with dual inboard and outboard arms, one of which transfers fluid between vessels and the other which transfers vapors between vessels.

Desirably, a swivel joint system is connected to the outboard end of the outboard arm and provides for movement of the flange connector of the loading arm in three mutually perpendicular planes. This is particularly true with loading arms which are connected to ships where movement of the ship during loading is a common occurrence. Such triple swivel joint assemblies for handling liquids in a single arm are standard in the industry.

It has been proposed to provide a dual loading arm having an outboard swivel assembly with three mutually perpendicular axes of rotation for attachment to a tank truck where the truck was provided with a liquid line having concentrically positioned therein a vapor line. See Ashton U.S. Pat. No. 3,372,715. This patent provided the desired rotational axes by introducing the vapor line through the wall and into the liquid line and then having the lines concentric permitting two of the axes of rotation to be common to the liquid and vapor line through concentric pipes. The third axis of rotation was also common to the liquid and vapor line.

Some ships have loading manifolds in which the liquid and vapor connector flanges are arranged generally side-by-side. This invention provides a loading arm which may be connected to side-by-side liquid and vapor flanges while providing for the liquid and vapor arms to be interconnected so that the two arms act as one and may be handled from a single standard. The invention provides the desired swivel connector system at the outboard end of the outboard arm with both the liquid and vapor connections free to rotate about three mutually perpendicular axes.

An object of this invention is to provide a dual loading arm with a swivel system at the outboard end of the outboard arm which is attachable to spaced flanges such as found on a ship in which the swivel system provides for rotation of both connecting flanges about three mutually perpendicular axes.

Another object is to provide a loading arm having a swivel system as in the preceding object in which one of the connecting means of the loading arm may also move toward and away from the other of the connecting means to permit the loading arm to be attached to ships having connecting flanges positioned at varying distances from each other.

Another object is to provide a swivel system at the outboard end of a dual loading arm in which selected elbows of the swivel system are connected to each other so that the swivel system of both of the arms move as a unit and selected swivels may be dismantled for repair without disassembly of the other swivels of the system.

Another object is to provide a dual loading arm with a swivel system at its outboard end permitting movement of the attaching flange of each line about three mutually perpendicular axes while routing and counterbalancing the elbows and pipes making up the swivel system to provide a minimum dead load moment about any substantially horizontal axis of swivel rotation.

Other objects, features and advantages of this invention will be apparent from the drawings, the specification, and the claims.

In the drawings wherein an illustrative embodiment of this invention is shown and wherein like numerals indicate like parts:

Figure 1:
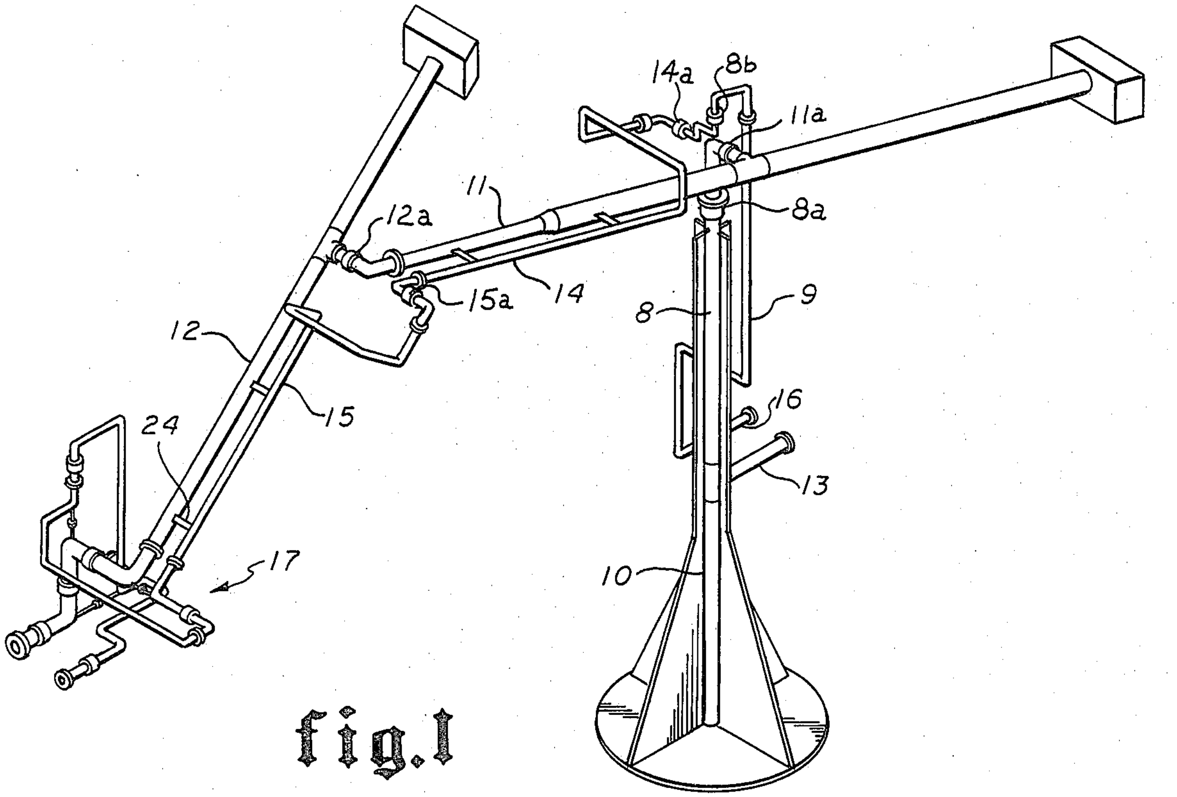
FIG. 1 is a view in elevation of a loading arm constructed in accordance with this invention.

Referring first to FIG. 1 the loading arm includes a support 10 on which the arms are mounted for rotation. Inboard and outboard arms 11 and 12, respectively, provide for flow of fluid from the main riser pipe inlet 13 which will normally be connected to a tank battery. In like manner inboard and outboard auxiliary arms 14 and 15 provide for flow of vapors through the auxiliary riser pipe outlet 16. The auxiliary riser pipe 16 will normally be connected to a facility for handling vapors received from a ship's tank.

The inboard arms are supported on the support 10 for rotation about horizontal and vertical axes. Coaxial swivels 8*a* and 8*b* provide for rotation about a vertical axis. Coaxial swivels 11*a* and 14*a* provide for rotation about a horizontal axis. The outboard arms 12 and 15 are supported on the inboard arms for rotation about a common horizontal axis by swivels 12*a* and 15*a*.

Carried at the outboard end of the two outboard arms is a dual swivel assembly indicated generally at 17 which is designed to connect to spaced flanges such as spaced flanges on the loading manifold of a ship.

Figure 2:
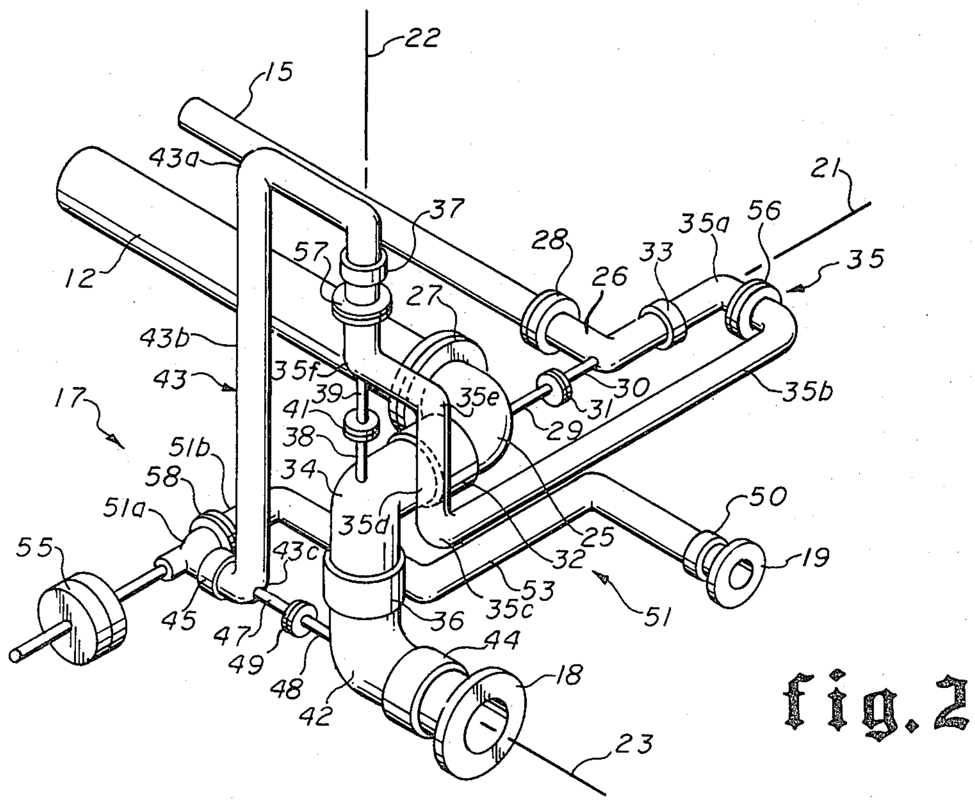
FIG. 2 is an elevational view of the swivel system of a loading arm with the outboard arm extending horizontally.
Figure 3:
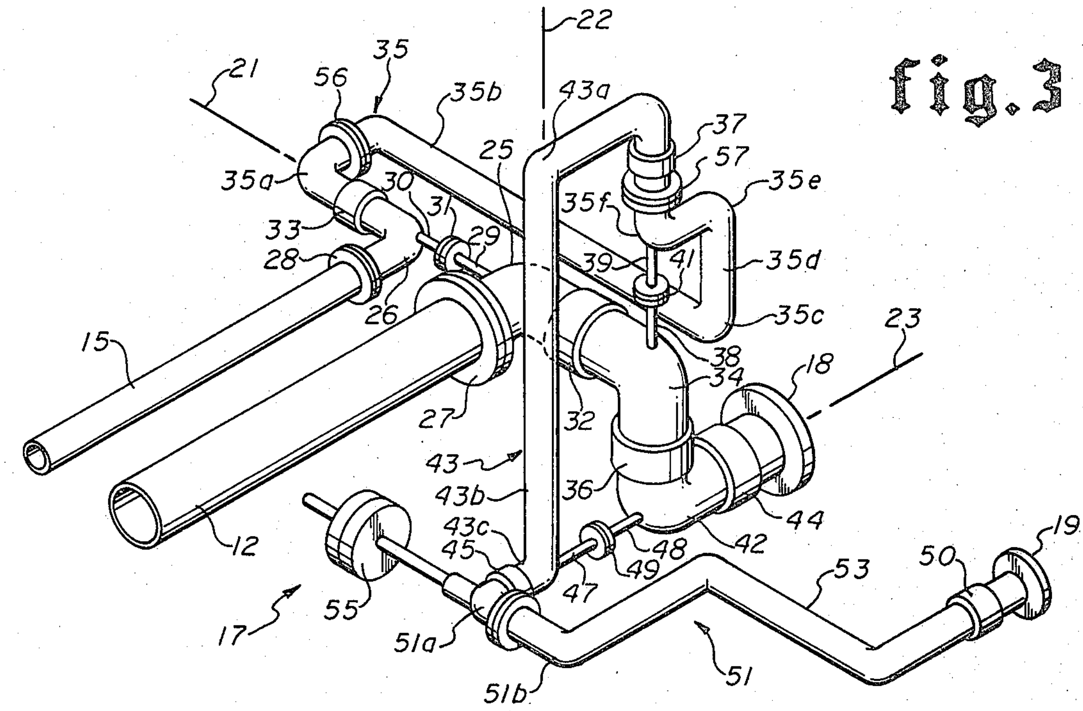
FIG. 3 is another elevational view of the loading arm swivel system taken from the opposite side of the system from FIG. 2.
Figure 4:
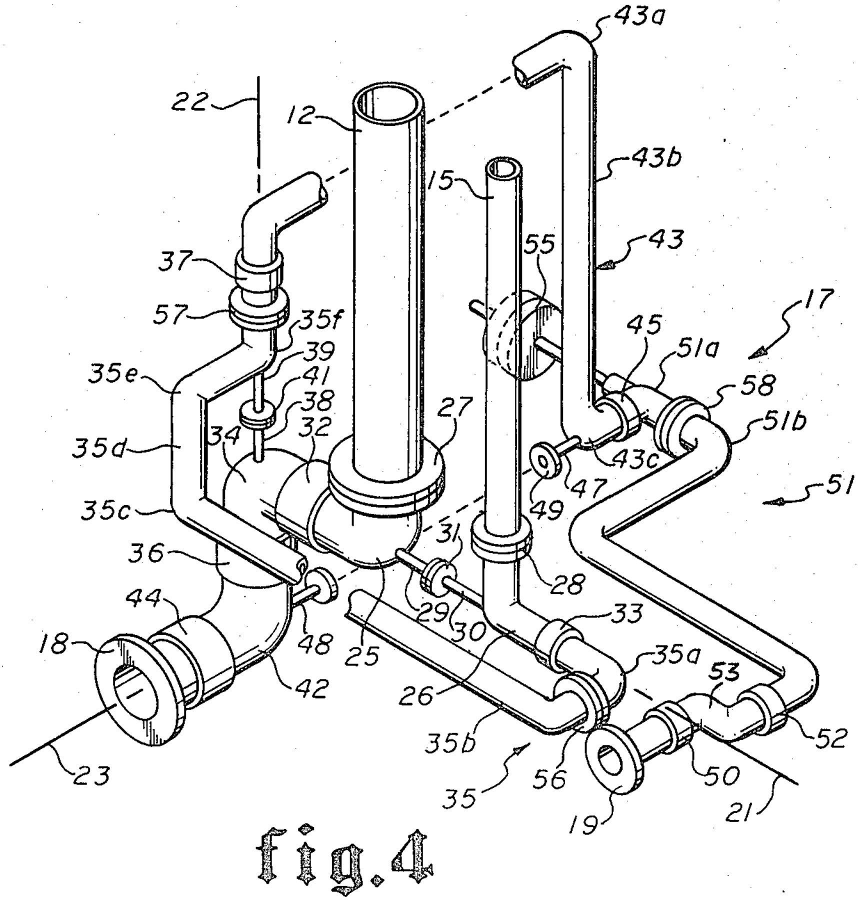
FIG. 4 is an elevational exploded view of the swivel system similar to FIG. 2 incorporating an additional swivel to permit the swivel system to be connected to ship's flanges of various spacing from each other.

Referring to FIGS. 2, 3 and 4 it will be seen that the swivel system 17 provides for rotation of the connecting means of each arm such as the flange connector 18 for the fluid line and the flange connector 19 for the vapor line rotatable about three mutually perpendicular axes 21, 22 and 23.

The outboard arms 12 and 15 may be connected together in any desired manner as indicated generally at 24.

Attached to the free ends of the outboard arms 12 and 15 are a first pair of spaced elbows 25 and 26, respectively.

Preferably, these elbows are attached to the outboard arms by the usual flange connectors 27 and 28.

It is also preferred that these elbows be connected to each other and this may be readily accomplished by the two pipes 29 and 30 welded to the elbows and joined by the flange connector 31.

At the outboard end of elbows 25 and 26 a first pair of spaced swivel joints 32 and 33 are provided. These swivel joints provide for rotation about the common axis 21. In the preferred form of this invention the axis 21 will extend horizontally.

Connected to the first pair of swivel joints are a second pair of elbows. Connected to the swivel 32 is an elbow 34 which in the preferred form is a 90° elbow. Connected to the swivel 33 is an elbow indicated generally at 35 which includes a U-section 35*a*, a straight section 35*b*, a 90° section 35*c*, a straight section 35*d*, and 90° bends 35*e* and 35*f* to bring the outlet end of the elbow 35 to a position overlying the elbow 34.

Connected to the elbows 34 and 35 are a second pair of spaced swivel joints 36 and 37, respectively. These two swivel joints provide for rotation about the common axis 22 which, in the preferred form of the invention, is a vertical axis.

Preferably, the elbows 34 and 35 are connected together, again by the short pipe sections 38 and 39, interconnected by the flange connector 41.

A third pair of spaced elbows are connected to the second pair of swivel joints. This may be provided by the elbow 42 connected to swivel joint 36 and by the elbow indicated generally at 43 connected to swivel joint 37. The elbow 43 includes a U-shaped section 43*a*, a straight section 43*b*, and a 90° section 43*c*.

Connected to the third pair of elbows 42 and 43 are a third pair of spaced swivels 44 and 45. The swivels 44 and 45 are arranged for rotation about axis 23 which, in the preferred form of the invention, is a horizontal axis.

A connector is preferably provided between the elbows 42 and 43 and may be provided by the pipe 47 on elbow 43 and the pipe 48 on elbow 42 joined by the flange connector 49.

A connecting means of any desired form such as the flanged connector 18 or some form of automatic connector such as shown in U.S. Pat. No. 3,586,350 is provided on swivel 44.

A connecting means indicated generally at 51 is connected to the swivel 45. This includes elbow 51*a* to which the pipe section 51*b* is attached.

The connector means 51 may include the flange 19 supported by swivel 50. As is well known in the art, this flange may have substituted therefor an automatic connector.

In the system shown in FIG. 4 the connecting means includes a connecting means swivel joint 52 and an angled arm 53 so that the flange connector 19 can rotate about the center of the connector swivel 52 and position the flange 19 at different points relative to the flange 18 on the liquid arm.

It is preferable that the several elbows be routed and/or counterbalancing means be provided so that a minimum dead load moment occurs about any substantially horizontal axis of swivel rotation. For this purpose the connector indicated generally at 51 has extending from the 90° section 51*a* a counterbalance 55 which counterbalances the weight of the vapor system downstream from the 90° section 51*a*. It will also be noted that the elbows 35 and 43 are routed in such manner as to counterbalance rotation of the swivel system about the horizontal axis of rotation 21. If desired, additional counterbalancing weights could also be utilized as, for instance, where heavy automatic connectors are substituted for the flange connectors 18 or 19. In this instance it might be desirable to provide additional counterweight to offset the weight of such automatic connectors.

The vapor swivel system is provided with flange connectors 56, 57 and 58 in addition to connector 28. These connectors together with flange connector 27 permit various sections of the system to be removed for repair without removing other sections.

In operation the loading arm will function in substantially the same manner as a single fluid loading arm. The arm may be rotated about its horizontal and vertical axes on the support and the inboard and outboard arm extended outwardly for attachment to the manifold of a tanker. With the swivel system in the vicinity of a tanker manifold, the swivel system may be rotated about either of its horizontal axes or its vertical axis to align the connectors with the ship's manifold. Additionally, the vapor connector may be rotated about the vapor connector swivel 52 to accommodate varying distances between the liquid and vapor flanges on the ship's manifold.

During the loading operation the swivel assembly will accommodate movement of the ship. If, for instance, the fore and aft level of the ship changes the swivel system is free to rotate about axis 23 to accommodate such movement. The loading arm may, of course, rise and fall in the conventional manner with movement of tides and rotation of the loading arm swivel system about its three axes, together with movement of the inboard and outboard arms about their axes, will accommodate any movement of the ship.

The foregoing disclosure and description of the invention are illustrative and explanatory thereof and various changes in the size, shape and materials, as well as in the details of the illustrated construction, may be made within the scope of the appended claims without departing from the spirit of the invention.

What is claimed is:

1. A loading arm comprising,
a support,
main and auxiliary riser pipes on said support,
inboard and outboard main and auxiliary arms carried by said support and connected to said riser pipes,
means maintaining said outboard arms in fixed relationship with each other,
a first pair of elbows spaced from each other and connected to said outboard arms,
a first pair of swivel joints spaced from each other and connected to said first pair of elbows and rotatable about a first axis,
a second pair of elbows spaced from each other and connected to said first pair of swivel joints,
a second pair of swivel joints spaced from each other and connected to said second pair of elbows and rotatable about a second axis perpendicular to said first axis,
a third pair of elbows spaced from each other and connected to said second pair of swivel joints,
a third pair of swivel joints spaced from each other and connected to said third pair of elbows and each rotatable about an axis perpendicular to both said first and second axes, and
a connecting means carried by each of said third pair of swivel joints.

2. The loading arm of claim 1 wherein said third pair of swivel joints are rotatable about a common axis.

3. The loading arm of claim 1 wherein said connecting means carried by the auxiliary arm includes a connecting means swivel joint rotatable about an axis parallel to the axis of rotation of said third pair of swivel joints and a connecting flange offset from the axis of said connecting means swivel joint.

4. The loading arm of claim 1 wherein each connecting means includes a swivel joint adjacent its free end.

5. The loading arm of claims 1, 2, 3 or 4 wherein means interconnect said second pair of elbows for concurrent rotation about said first axis.

6. The loading arm of claims 1, 2, 3 or 4 wherein means interconnect said third pair of elbows for common rotation of said second pair of elbows about said first axis and said third pair of elbows about said second axis.

7. The loading arm of claims 1, 2, 3 or 4 wherein releasable connecting means are provided between said second pair of elbows and between said third pair of said elbows to provide for common rotation of the elbows of each pair and to facilitate repair of the first and second pair of swivel joints.

8. The loading arm of claims 1, 2, 3 or 4 wherein counterbalance means is provided for one of the connecting means to couterbalance rotation about one of the third pair of swivel joints.

9. The loading arm of claims 1, 2, 3 or 4 wherein releasable connecting means are provided between said second pair of elbows and between said third pair of elbows to provide for common rotation of the elbows of each pair and to facilitate repair of the first and second pair of swivel joints, and wherein counterbalance means is provided for one of the connecting means to counterbalance rotation about one of the third pair of swivel joints.

10. The loading arm of claims 1, 2, 3 or 4 wherein the loading arm outboard of said first pair of swivels is routed and counterbalanced to provide a minimum dead load moment about any substantially horizontal axis of swivel rotation.

* * * * *